(12) United States Patent
Puthillathe et al.

(10) Patent No.: US 10,740,467 B2
(45) Date of Patent: Aug. 11, 2020

(54) REMOTE ACCESS CONTROLLER IN-BAND ACCESS SYSTEM

(71) Applicant: Dell Products L.P., Round Rock, TX (US)

(72) Inventors: Chandrasekhar Puthillathe, Bangalore (IN); Shekar Babu Suryanarayana, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 206 days.

(21) Appl. No.: 16/034,747

(22) Filed: Jul. 13, 2018

(65) Prior Publication Data

US 2020/0019708 A1  Jan. 16, 2020

(51) Int. Cl.
*G06F 21/57* (2013.01)
*G06F 9/4401* (2018.01)
*H04L 9/32* (2006.01)
*H04L 9/08* (2006.01)
*H04L 29/08* (2006.01)

(52) U.S. Cl.
CPC ......... *G06F 21/575* (2013.01); *G06F 9/4411* (2013.01); *G06F 9/4416* (2013.01); *H04L 9/0825* (2013.01); *H04L 9/3228* (2013.01); *H04L 67/025* (2013.01)

(58) Field of Classification Search
CPC .... G06F 21/575; G06F 9/4411; G06F 9/4416; H04L 63/00; H04L 67/025; H04L 9/3228; H04L 9/3297
See application file for complete search history.

(56) References Cited

U.S. PATENT DOCUMENTS

| | | | |
|---|---|---|---|
| 9,218,301 B2 * | 12/2015 | Gupta | G06F 12/1466 |
| 2011/0258410 A1 * | 10/2011 | Lambert | G06F 11/2284 |
| | | | 711/164 |
| 2019/0034382 A1 * | 1/2019 | Hargrave | G06F 3/0665 |

\* cited by examiner

*Primary Examiner* — Terrell S Johnson
(74) *Attorney, Agent, or Firm* — Haynes and Boone, LLP

(57) ABSTRACT

An in-band remote access controller access system includes a remote access controller. A Basic Input/Output System (BIOS) that is coupled to the remote access controller and includes a BIOS storage that stores a configuration table including a plurality of function definitions that are configured to provide for the management of an in-band communication session with the remote access controller. A secure storage system includes boot security information that is configured to provide for the performance of a managed boot of the BIOS. A processing system provides, to the remote access controller using at least one of the plurality of function definitions, application security information provided by an application requesting access to the remote access controller. The remote access controller authenticates the application security information using the boot security information and, in response, establishes a communication session with the application.

20 Claims, 7 Drawing Sheets

REMOTE ACCESS CONTROLLER IN-BAND ACCESS SYSTEM

BACKGROUND

The present disclosure relates generally to information handling systems, and more particularly to providing in-band access to a remote access controller in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, are typically managed in order to update firmware, restore platforms, retrieve server event/error logs, retrieve or update boot configuration data, and/or provide for a variety of other server management activities known in the art. In conventional systems, server devices include a remote access controller (e.g., a Dell Remote Access Controller (DRAC) or integrated DRAC (iDRAC) available from DELL® Inc. of Round Rock, Tex., United States) that performs much of the management for the server device, and management data (e.g., firmware image data, platform restore data, server event/error logs, boot configuration data, etc.) is used for performing out-of-band server management activities. In some situations, operating system (OS) applications may require in-band access to the remote access controller. However, there are security concerns associated with in-band access to the remote access controller, as current solutions of in-band access use implicit trust and/or temporary authorization techniques. This implicit trust/authorization makes the remote access controller accessible to any OS application once the authorization is exposed. For example, a recent specification from the Distributed Management Task Force (DMTF), Redfish Host Interface, defines a method to create an authenticated Redfish session from an OS kernal. However, this proposal has a security concern associated with legacy operating systems exposing temporary credentials to any OS application. Other authentication mechanisms for OS applications include using Intelligent Platform Management Interface (IPMI) commands. However, the remote access controller will be accessible to any OS application once the IPMI commands are exposed.

Accordingly, it would be desirable to provide an improved remote access controller in-band access system.

SUMMARY

According to one embodiment, an information handling system (IHS) includes a remote access controller; a processing system coupled to the remote access controller; and a memory system that is coupled to the processing system and that includes instructions that, when executed by the processing system, cause the processing system to provide a runtime engine that is configured to: provide, to the remote access controller using at least one of a plurality of function definitions that are configured to provide for the management of an in-band communication session with the remote access controller and that were written to the memory system by a BIOS during a managed boot from a configuration table, application security information provided by an application requesting access to the remote access controller, and wherein the remote access controller is configured to: authenticate the application security information using boot security information stored in a secure storage system coupled to the remote access controller and, in response, establish a communication session with the application.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
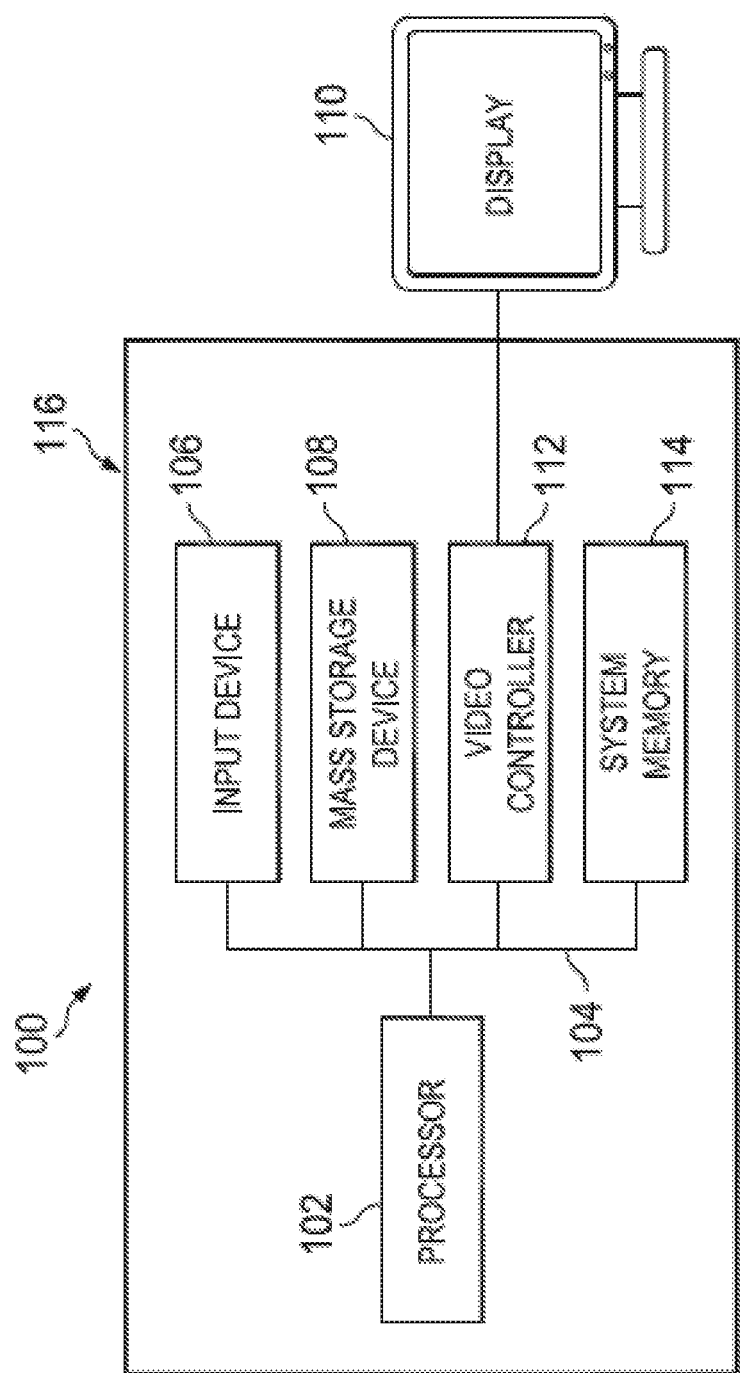
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
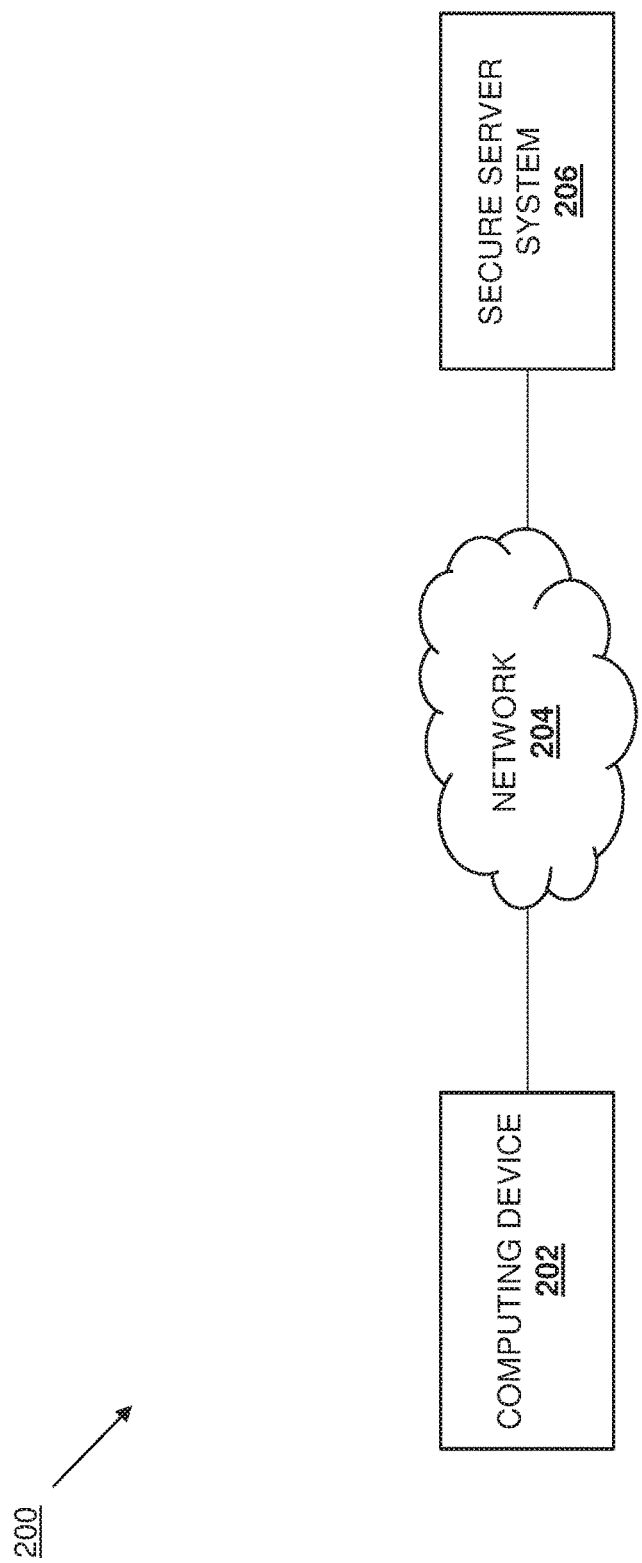
FIG. 2 is a schematic view illustrating an embodiment of a remote access controller in-band access system.

Referring now to FIG. 2, an embodiment of an in-band remote access controller access system 200 is illustrated. In the illustrated embodiment, the in-band remote access controller access system 200 includes a computing device 202, which may be provided by the IHS 100 discussed above with reference to FIG. 1, and/or may include some or all of the components of the IHS 100. In specific examples, the computing device 202 may be provided by a server device, a networking device (e.g., a switch device, a router device, etc.), a desktop computing device, a laptop/notebook computing device, and/or a variety of other computing devices that would be apparent to one of skill in the art in possession of the present disclosure. In the embodiment illustrated in FIG. 2, the computing device 202 is coupled through a network 204 to the secure server system 206. One of skill in the art in possession of the present disclosure will recognize that the network 204 is described below as a Local Area Network (LAN), but in other embodiments may include the Internet and/or other network or network combinations while remaining within the scope of the present disclosure. The secure server system 206 may include one or more server devices that are configured to access the computing device 202 via a remote access controller in the computing device 202 that provides an out-of-band channel between the computing device 202 and the secure server system 206, discussed in more detail below.

Figure 3:
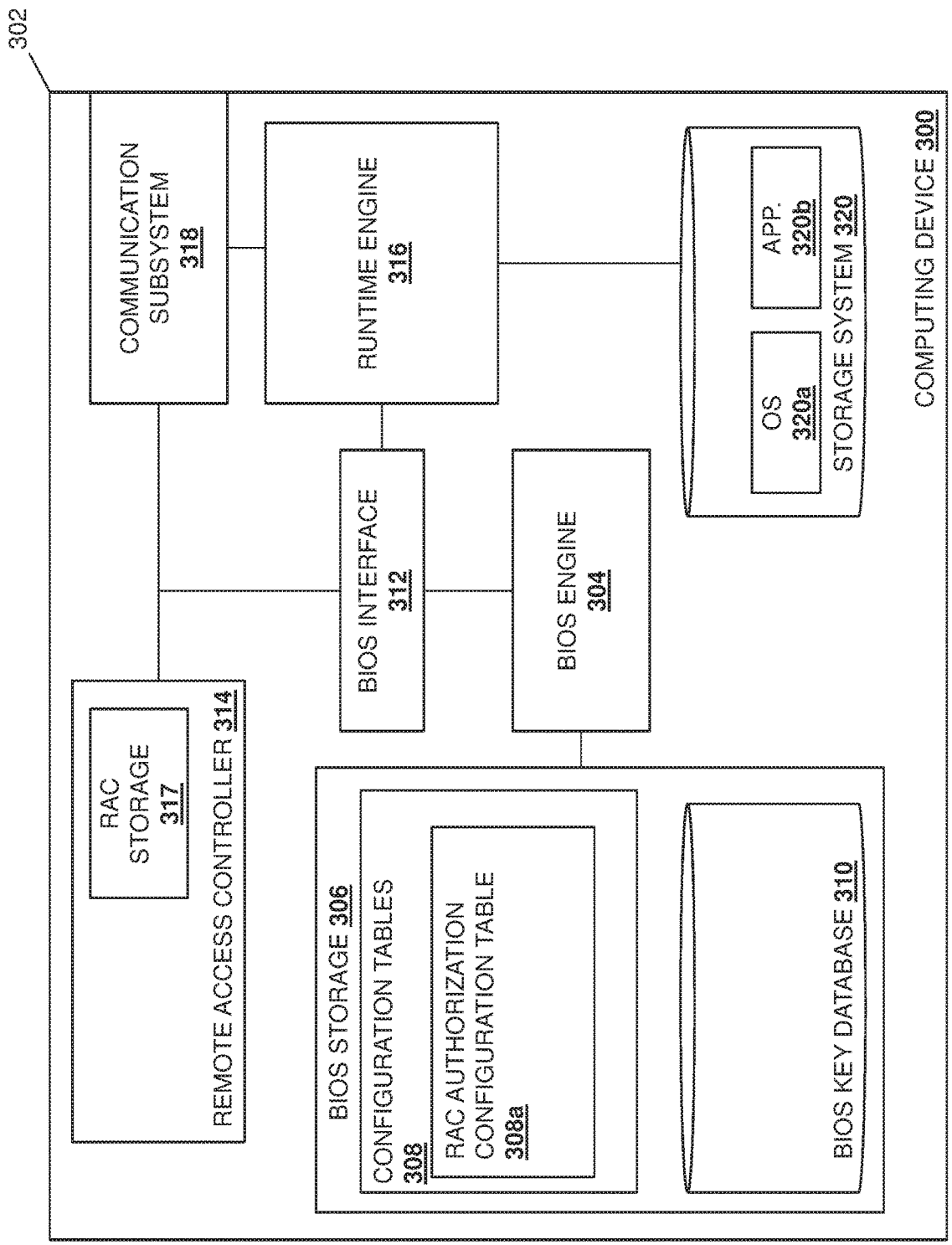
FIG. 3 is a schematic view illustrating an embodiment of a computing device used in the remote access controller in-band access system of FIG. 2.

Referring now to FIG. 3, an embodiment of a computing device 300 is illustrated that may be the computing device 202 discussed above with reference to FIG. 2. As such, the computing device 300 may be provided by the IHS 100 discussed above with reference to FIG. 1, and/or may include some or all of the components of the IHS 100, and in specific embodiments may be provided by a server device, a networking device (e.g., a switch device, a router device, etc.), a desktop computing device, a laptop/notebook computing device, and/or a variety of other computing devices that would be apparent to one of skill in the art in possession of the present disclosure. In the illustrated embodiment, the computing device 300 includes a chassis 302 that houses the components of the computing device 300, only some of which are illustrated in FIG. 3. For example, the chassis 302 may house a BIOS processing system (not illustrated, but which may include the processor 102 discussed above with reference to FIG. 1) and a BIOS memory system (not illustrated, but which may include the memory 114 discussed above with reference to FIG. 1) that is coupled to the BIOS processing system and that includes instructions that, when executed by the BIOS processing system, cause the BIOS processing system to provide a BIOS engine 304 that is configured to perform the functions of the BIOS engines and computing devices discussed below. One of skill in the art in possession of the present disclosure will recognize that the BIOS engine 304 may be provided by non-volatile firmware in the computing device 300 that is also configured to perform conventional BIOS functions such as hardware initialization during a booting process for the computing device 300, runtime services for operating system and applications executed by the computing device 300, and/or any other BIOS functionality know in the art. Furthermore, while the term "BIOS" is used, one of skill in the art in possession of the present disclosure will recognize that the BIOS engine 304 may operate according to the Universally Extensible Firmware Interface (UEFI) specification while remaining within the scope of the present disclosure.

The chassis 302 may also house a BIOS storage 306 that is coupled to the BIOS engine 304. While the BIOS storage 306 is illustrated as coupled to the BIOS engine 304 (e.g., via a coupling between the BIOS storage 306 and the BIOS processing system that provides the BIOS engine 304), the BIOS storage 306 may be part of a BIOS that includes the BIOS engine 304 while remaining within the scope of the present disclosure. In a specific example, the BIOS storage 306 may be provided by a Serial Peripheral Interface (SPI) flash device, although other storage devices may fall within the scope of the present disclosure as well. In the illustrated embodiment, the BIOS storage 306 is illustrated as storing configuration tables 308 that are used to perform a managed boot of the computing device. The configuration tables may include a remote access controller authorization configuration table 308a that includes function definitions that are configured to provide for the management of communication sessions between a remote access controller 314 and a runtime application. In the illustrated embodiment, the BIOS storage 306 also includes a BIOS key database 310 that is configured to store boot security information (e.g., keys such as the KEKs, a PK, and application public keys discussed herein) that are provided for a secure boot process and for authenticating an runtime applications, discussed in further detail below. While a few specific elements that may be stored in the BIOS storage 306 have been described, one of skill in the art in possession of the present disclosure recognize that the BIOS storage may store a variety other BIOS storage elements while remaining within the scope of the present disclosure.

The chassis 302 may also house a BIOS interface 312 that is coupled to the BIOS engine 304 (e.g., via a coupling with the BIOS processing system that provides the BIOS engine 304) and that may include a Remote Access Controller ADMinistrator (RACADM) interface, a Web Services MANagement (WSMAN) interface, and/or a variety of other BIOS interfaces that would be apparent to one of skill in the art in possession of the present disclosure. As illustrated, the chassis 302 may house a remote access controller 314 that is coupled to the BIOS interface 312 (e.g., via a coupling with the RACADM interface discussed above) and that may be provided by, for example, an integrated Dell Remote Access Controller (iDRAC) provided by DELL® Inc. of Round Rock, Tex., United States, a baseboard management controller (BMC), and/or any other out-of-band controller that would be apparent to one of skill in the art in possession of the present disclosure. The remote access controller 314 enables an out-of-band management path for the computing device 300 and uses resources that are separate from the computing device 300 to provide for management of the computing device 300 via, for example, a browser based interface or Command Line Interface (CLI) at the secure server system 206. As such, the remote access controller 314 may include a processing system (not illustrated, but which may include the processor 102 discussed above with reference to FIG. 1) and a memory system (not illustrated, but which may include the system memory 114 discussed above with reference to FIG. 1) that is coupled to the processing system and that includes instructions that, when executed by the processing system, cause the processing system to perform the operations of the remote access controllers discussed below. Thus, the remote access controller 314 functions as a separate microcontroller in computing device 300, providing a dedicated management channel for maintenance and control of resources in the computing device 300. In various embodiments, the remote access controller 314 is powered at all times and is thus available in-band when an operating system hosted on the computing device 300 is running and also available out-of-band when the computing device 300 is powered down or has no network connectivity through a communication subsystem 318. A core function of the remote access controller 314 is the collection of data from a variety of sensors within chassis 302. For example, the remote access controller 314 may collect hardware operational data such as temperature, fan speed, current, voltage, memory status, and make this data available to the secure server system 206, as well as allow system administrators to remotely manage, monitor, troubleshoot, remediate, and upgrade the computing device 300 independent of the operating system status. The chassis 302 may also house a remote access controller (RAC) storage 317 that may be used by the remote access controller 314 and the runtime engine 316 to provide communications between each other via the RAC storage 317 using shared memory access (SMA), as discussed below.

The chassis 302 may also house a primary processing system (not illustrated, but which may include the processor 102 (e.g., a Central Processing Unit (CPU)) discussed above with reference to FIG. 1) and a primary memory system (not illustrated, but which may include the memory 114 discussed above with reference to FIG. 1) that is coupled to the primary processing system and that includes instructions that, when executed by the primary processing system, cause the primary processing system to provide a runtime engine 316 that is configured to provide the runtime functionality (e.g., operating system functionality, application functionality, and/or other runtime functionality that would be apparent to one of skill in the art in possession of the present disclosure) of the runtime engines and computing devices discussed below. The runtime engine 316 is coupled to the BIOS interface (e.g., via a coupling between the primary processing system and the BIOS interface 312). The chassis 302 may also house a storage system 320 that is coupled to the runtime engine 316 and/or the BIOS engine 304. The storage system 320 may include any of a variety of storage devices and/or other components that allow for the storage of an operating system (OS) 320a that may be loaded during the booting process by the BIOS engine 304 and the runtime engine 316 and executed while the computing device 300 is in a runtime environment, runtime applications 320b that may be executed while the computing device is in the runtime environment, as well as any of the other data discussed below. The chassis 302 may also house a communication subsystem 318 that is coupled to the runtime engine 316 (e.g., via a coupling between the primary processing system and the communication subsystem 318) and to the remote access controller 314, and that may be provided by a Network Interface Controller (NIC), a wireless communication subsystem (e.g., a WiFi communication subsystem, a BLUETOOTH® communication subsystem, a Near Field Communication (NFC) subsystem, and/or other wireless communication subsystems know in the art), and/or any other communication components that would be apparent to one of skill in the art in possession of the present disclosure. While a specific computing device 300 has been illustrated and described, one of skill in the art in possession of the present disclosure will recognize that computing devices may include other components and/or component configurations for performing conventional functionality, as well as the functionality discussed below, while remaining within the scope of the present disclosure.

Figure 4:
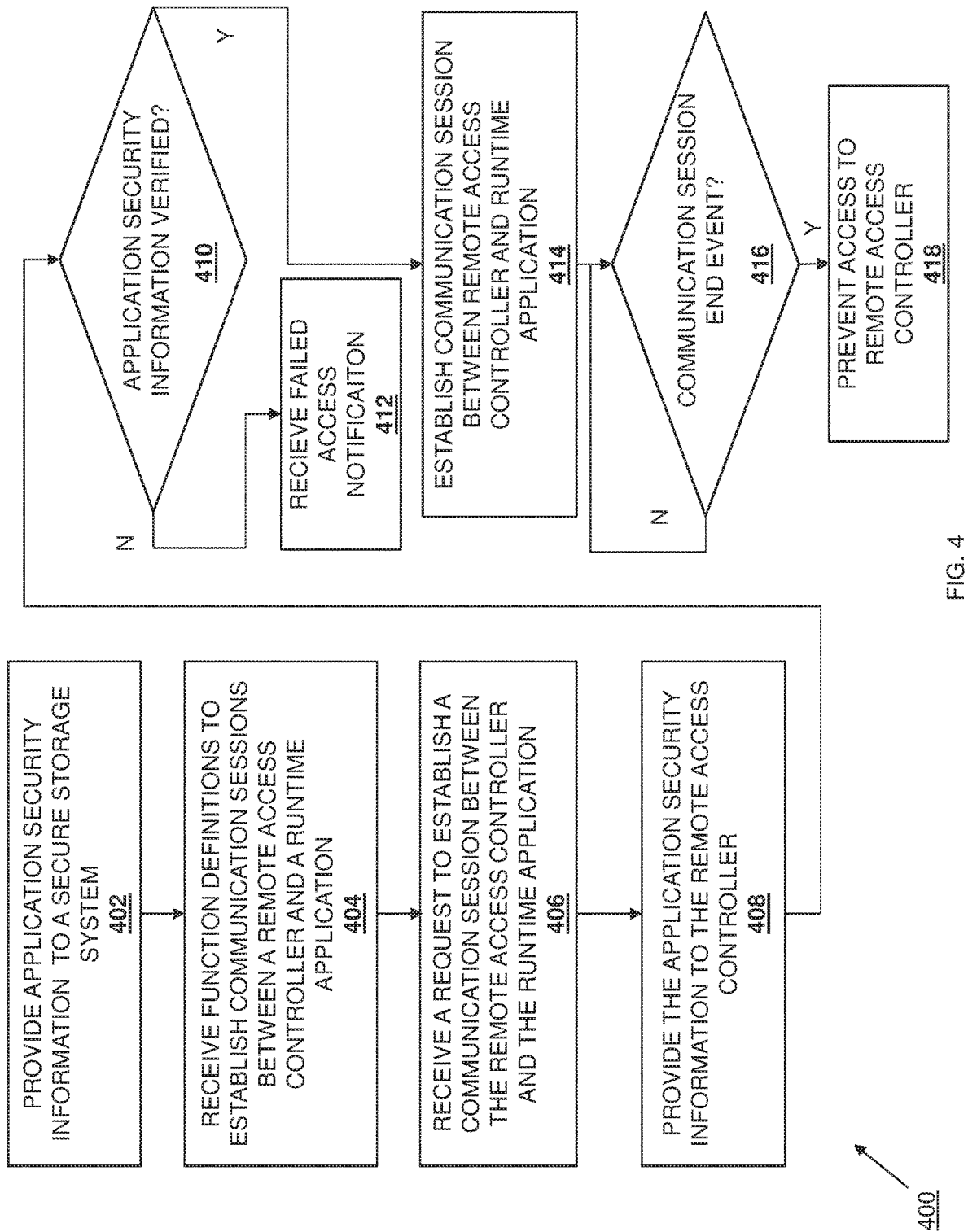
FIG. 4 is a flow chart illustrating an embodiment of a method for in-band access of a remote access controller.

Referring now to FIG. 4, an embodiment of a method 400 for providing in-band access to a remote access controller is illustrated. As discussed below, the systems and methods of the present disclosure provide in-band access for runtime applications to a remote access controller. The runtime applications may include application security information that can be verified by the remote access controller using corresponding application security information that is stored with boot security information used to perform a secure boot of the operating system by the BIOS, or in another trusted storage system accessible by the remote access controller. The BIOS may also provide configuration functions to the operating system that allow the operating system to manage (e.g., create, delete, etc.) a communication session during operating system runtime and upon a request from any of the runtime applications. The runtime applications may provide the application security information to the remote access controller, and the remote access controller will then verify the security information to determine whether the runtime application is a trusted application. In response authenticating a runtime application, the remote access controller may provide the runtime application access to management information. The systems and methods of the present disclosure eliminate the security concerns of conventional remote access controller in-band access systems that rely on credentials, as the runtime applications themselves may be trusted by the firmware and system based on their authentication by the remote access controller using application security information stored in a trusted storage system.

The method 400 may begin at block 402 where application security information for a runtime application is provided to a secure storage system. In an embodiment of block 402, the runtime application 320b may be provided application security information and the BIOS key database 310 may be provided corresponding application security information. For example, the runtime application 320b may utilize code signing to verify its identity. Thus, the runtime application 320b may be signed by a certificate authority (CA) and be provided an application public key and an application private key. A corresponding application public key may then be provided as the corresponding application security information in the BIOS key database 310. The corresponding application security information provided in the BIOS key database 310 may be referred to below as boot security information (e.g., to distinguish it from the application security information provided for the runtime application.) In an embodiment, the entry of the corresponding application security information to the BIOS key database 310 may be performed during a build process of the remote access controller 314, during factory configuration of the computing device 300, and/or at any other time that would be apparent to one of skill in the art in possession of the present disclosure. In various embodiments, the computing device 202 may receive the corresponding application security information from the secure server system 206 via the remote access controller 314, and stores that corresponding application security information in the BIOS key database 310. For example, when the runtime applications 320b are installed after the factory build process, the corresponding application security information may be provided to the BIOS key database 310 from the secure server system 206 via the remote access controller 314 and/or locally through the BIOS engine 304.

While the corresponding application security information is described as being stored in the BIOS key database 310, one of skill in the art in possession of the present disclosure will recognize that the storage of the corresponding application security information in some other secure storage system in the computing device 300 will fall within the scope of the present disclosure as well. For example, the corresponding application security information may be stored in a trusted database located on the remote access controller 314. In yet other embodiments, the corresponding application security information may remain at the secure server system 206 for use in verifying certificates remotely. Thus, while a few examples of the provisioning and storage of application security information (such as public and private application keys) in different manners has been described, one of skill in the art in possession of the present disclosure will recognize that the application security information utilized by the systems and methods of the present disclosure may be provisioned and/or stored in a variety of other manners that will fall within the scope of the present disclosure.

The method 400 then proceeds to block 404 where function definitions to establish remote access controller sessions are provided to the runtime engine 316 by the BIOS engine 304 during a managed boot of the computing device. In an embodiment of block 404, the BIOS engine 304 may perform a managed boot of the computing device 300 to load the operating system 320a on the runtime engine 316 and enter a runtime environment. During the managed boot, a variety of security checks may be performed using cryptographic keys stored in the BIOS key database 310 such that the boot drivers and operating system 320a may be trusted. For example, the BIOS engine 304 may perform a managed boot (e.g., Secure Boot) using a Platform Key (PK) and/or Key Exchange Keys (KEKs) that are based off of the PK. During, the managed boot, the BIOS engine 304 may access a plurality of configuration tables 308 that are stored in the BIOS storage 306 and that are used in the managed boot process to initialize the computing device 300. As discussed above, the configuration tables 308 may include a remote access controller authorization configuration table 308a that includes function definitions to manage communication sessions between the remote access controller 314 and a runtime application 320b. For example, the remote access controller authorization configuration table 308a may be an Advanced Configuration and Power Interface (ACPI) table that may be defined and linked to an EFI System Resource Table (ESRT). The BIOS engine 304 may provide the function definitions to manage the communication sessions between the remote access controller 314 and any runtime application 320b to a reserved memory space on system memory of the processing system that provides the runtime engine 316.

Figure 6A:
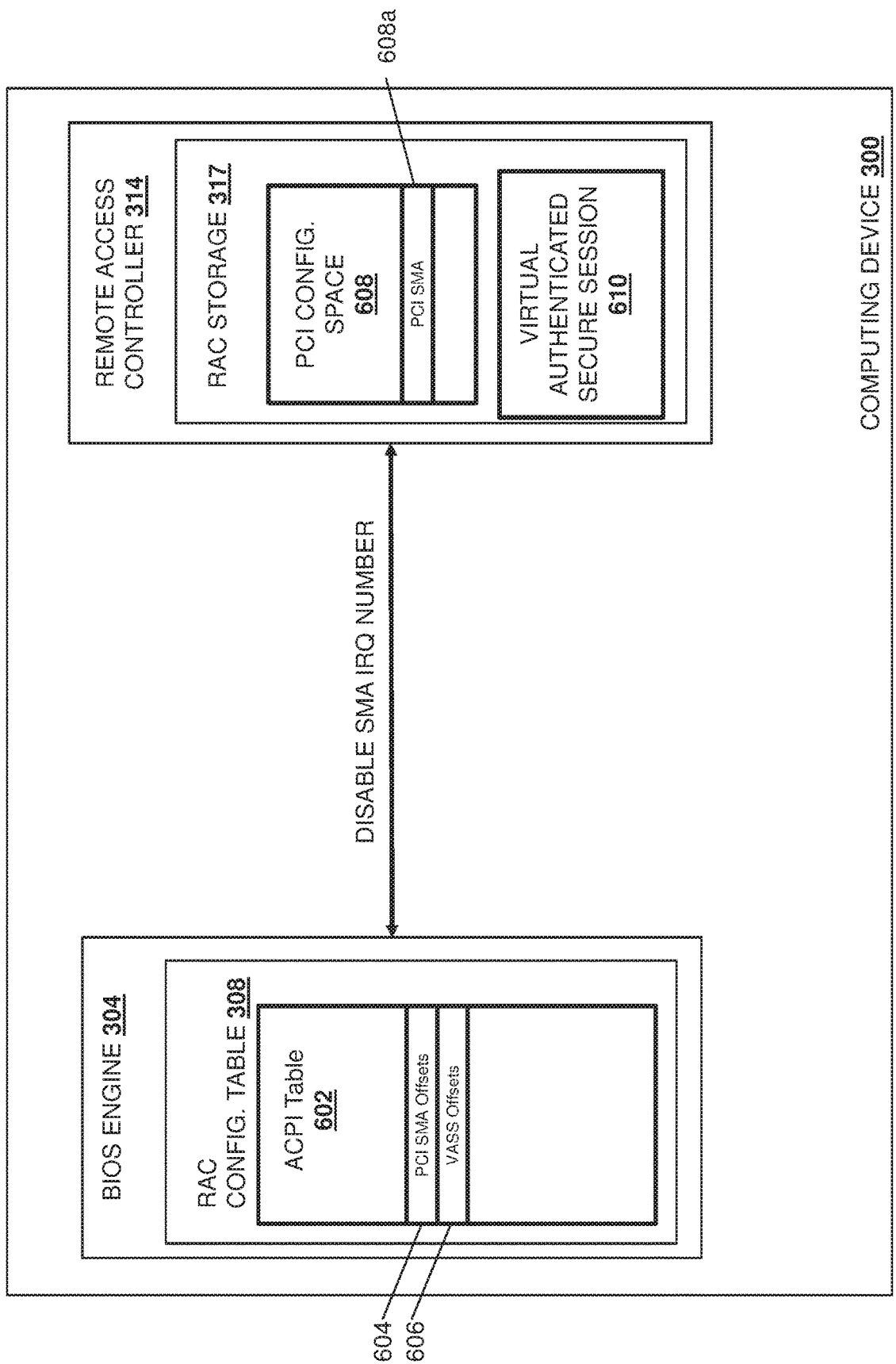
FIG. 6A is a schematic view illustrating an embodiment of the computing device of FIG. 3 during the method of FIG. 4.
Figure 6B:
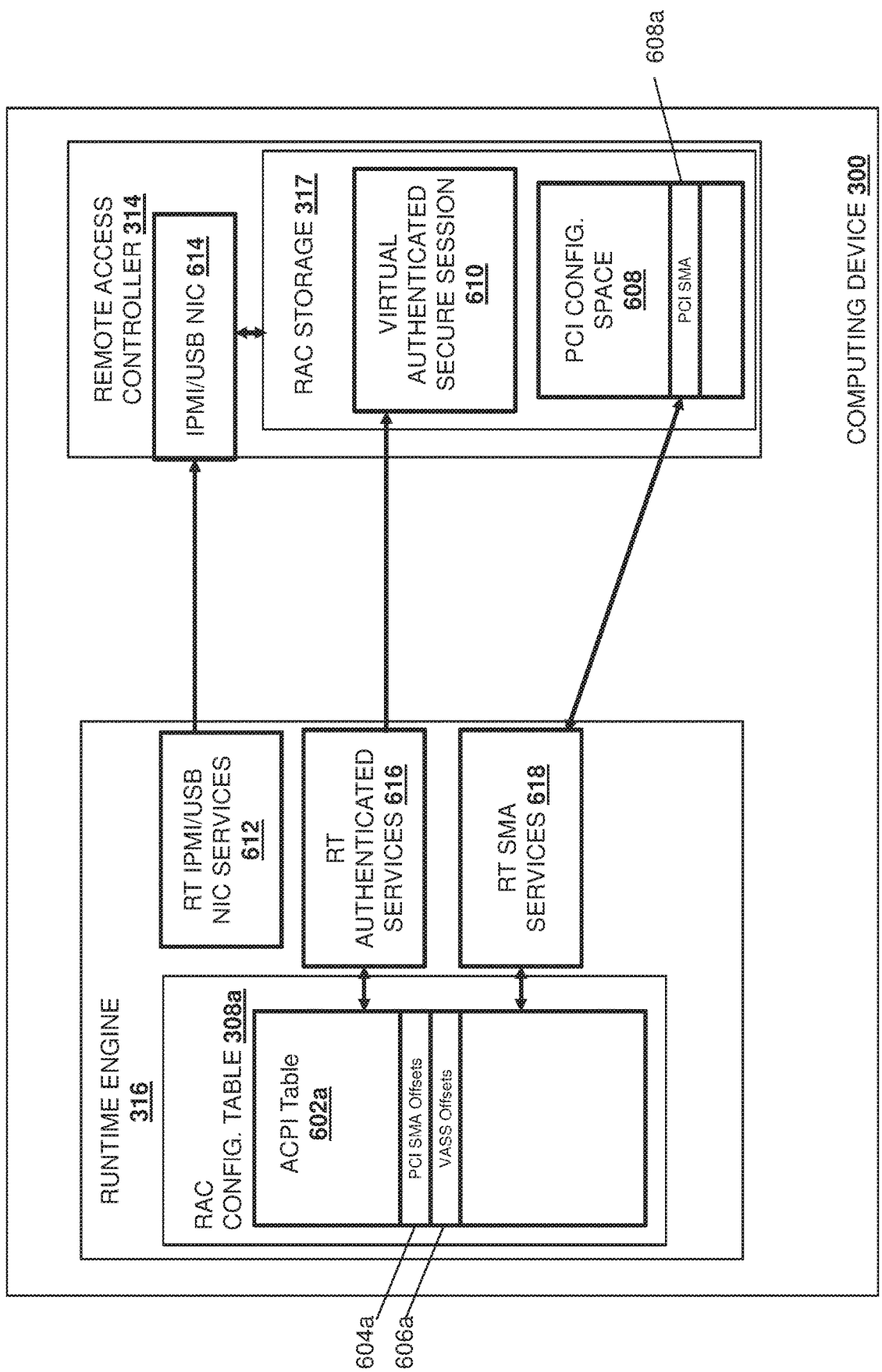
FIG. 6B is a schematic view illustrating an embodiment of the computing device of FIG. 3 during the method of FIG. 4.

Furthermore, during the managed boot of the computing device 300 and with reference to FIG. 6, the remote access controller configuration table 308 that may include an ACPI table 602 that includes peripheral component interconnect (PCI) secure memory access (SMA) offsets 604 and virtual authenticated secure session (VASS) offsets 606 that the BIOS engine 304 may use to disable SMA functions for operating system 320a access during boot time. For example, the BIOS engine 304 may disable an SMA interrupt request (IRQ) number provided in PCI configuration space 608 that provides access to the PCI SMA 608a, which disables any communication sessions (e.g., a virtual authenticated secure session 610) between the runtime engine 316 and the remote access controller 314.

Figure 5:
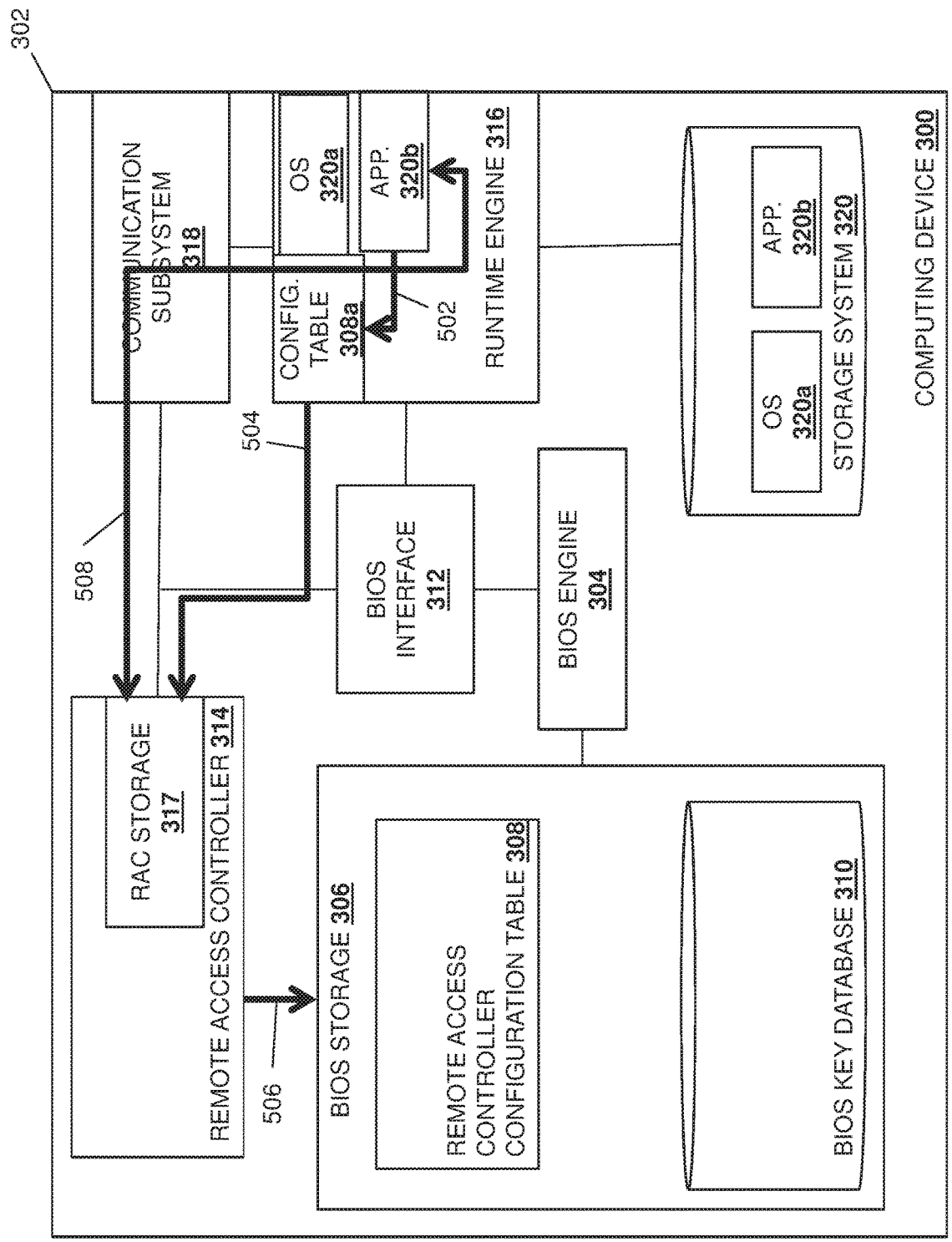
FIG. 5 is a schematic view illustrating an embodiment of the computing device of FIG. 3 during the method of FIG. 4.

The method 400 then proceeds to block 406 where a request to establish a communication session with the remote access controller is received from a runtime application. In an embodiment of block 406, the runtime application 320b may provide a request to the runtime engine 316 to access the remote access controller 314, and the runtime engine 316 may then retrieve the application security information from the runtime application 320b and provide that application security information in initial communications with the remote access controller 314. In an example, the runtime engine 316 may use an application private key of the runtime application 320b to encrypt a current timestamp of the request and a session identifier that may be randomly generated. A resulting hash of the current timestamp and the session identifier may be provided to a communication session creation function that is part of the functions definitions that are included in the remote access controller authorization configuration table 308a and that were provided to the runtime engine 316 from the BIOS engine 304 during the managed boot process. The public key of the runtime application 320b may also be provided to the remote access controller session creation function. For example, as illustrated by arrow 502 in FIG. 5, the runtime application 320b may request access to the remote access controller 314 via functions definitions provided by the remote access controller authorization configuration table 308a In an embodiment and with reference to FIG. 6B, a runtime IPMI/a universal serial bus (USB) network interface controller (NIC) service 612 may provide to an interface 614 (e.g., an IPMI interface and/or a USB-NIC interface) at the remote access controller 314 the request to establish a communication session with the remote access controller 314. Runtime authenticated services 616 may use the ACPI table 602a provided in the remote access controller table 308a to perform a secure runtime authenticated handshake to enable SMA.

The method 400 then proceeds to block 408 where the application security information is provided to the remote access controller. In an embodiment of block 408, the runtime engine 316 may provide the application security information to the remote access controller 314. The communication session creation function that is part of the function definitions that are included in the remote access controller authorization configuration table 308a may rely on a management interface with the remote access controller 314 to provide the application security information to the remote access controller 314. For example, the management interface may be provided by Shared memory Access (SMA) via the RAC storage 317. As illustrated by the arrow 504 of FIG. 5, the runtime engine 316, via a remote access controller session creation function included in the remote access controller authorization configuration table 308a, may provide the application security information to the remote access controller 314. In an embodiment and with reference to FIG. 6B, a runtime SMA service 618 using the PCI SMA offsets 604a may provide the corresponding PCI SMA offsets 608a the application security information. The runtime engine 316 and the remote access controller 314 may use the SMA 608a to communicate with each other by performing read and writes to the PCI SMA 608a.

The method 400 then proceeds to decision block 410 where the remote access controller verifies the application security information. In an embodiment of block 410, the remote access controller 314 may determine whether the application security information is verifiable. For example, the remote access controller 314 may verify whether the boot security information stored at the BIOS key database 310 corresponds with the application security information. The remote access controller 314 may retrieve boot security information such as, for example, any corresponding application security information that was stored in the BIOS key database 310 as discussed above, and determine whether the application security information received at block 408 corresponds with that corresponding application security information. For example and as illustrated by arrow 506 of FIG. 5, the remote access controller 314 may compare the application public key received through the RAC storage 317 using SMA to the public keys in the BIOS key database 310 to verify that the application public key is present in the BIOS key database 310, which indicates to the remote access controller 314 that the runtime application 320b is a trusted runtime application for in-band access of the remote access controller 314. The remote access controller 314 may then use the application public key to decrypt the encrypted timestamp and session identifier, or otherwise verify that the timestamp and the session identifier were signed by the application private key corresponding to the application public key. In various embodiments, the decrypted timestamp may be validated for a predetermined timeout threshold (e.g., 1 millisecond, 1 sec., 30 sec., 1 min., 90 sec. and/or any other reasonable timeout threshold). The timestamp may be provided because the clocks of the remote access controller 314 and the runtime engine 316 may be out-of-sync. For example, the remote access controller 314 may not have a clock and synchronizes with a clock provided by the BIOS engine 304, which may be out-of-sync with the runtime engine 316. If any of: the application-public-key-to-boot-public-key verification, the hash decryption, or the predetermined timeout threshold validation fail, then the method 400 may proceed to block 412 where a failed access notification is provided to the runtime application.

However, if the application security information is verified at decision block 410, the method 400 then proceeds to block 414 where a communication session is established between the remote access controller and the runtime application. In an embodiment of block 414, the remote access controller 314 may provide a notification to the runtime application 320b that application security information was verified, and a communication session including the session identifier is established. For example, ACPI may provide a return code to indicate failure or success and/or remote access controller interfaces such as, for example, Redfish, CLI and/or other remote access controller interfaces that would be apparent to one of skill in the art in possession of the present disclosure may reject or accept requests. As illustrated by arrow 508 of FIG. 5, the runtime application 320b may now communicate with the remote access controller using the session identifier via various communication protocols such as, for example, HTTP, HTTPs, SNMP, IPMI and/or other communication protocols that would be apparent to one of skill in the art in possession of the present disclosure. The remote access controller 314 may validate the session identifier provided from the runtime application with any communications using session identifier validators provided via management standards such as Redfish, WS-Management, and/or any other management standard that utilizes session identifier validation that would be apparent to one of skill in the art in possession of the present disclosure. When the session identifier is validated, the remote access controller 314 allows access to the management information and other functions provided by the remote access controller 314.

The method 400 may then proceed to decision block 416 where a determination is made as to whether a communication session end event has occurred. In an embodiment of block 416, the remote access controller 314 may determine whether a communication session end event that indicates the communication session should end has occurred. If a communication session end event has not occurred, then the remote access controller 314 may continue to provide communications between the remote access controller 314 and the runtime application 320b, as well as monitor the communication session at block 416. However, if the remote access controller 314 determines that a communication session end event has occurred, then the remote access controller 314 may prevent access by the runtime application 320b at block 418. For example, the remote access controller 314 may maintain an expiry timer that may indicate a time period for which the communication session between the remote access controller 314 and the runtime application 320b is to remain active, or may monitor for a time period of inactivity between the runtime application 320b and the remote access controller 314. If the expiry timer reaches the predetermined threshold, (e.g., a time period defined at the expiry timer), then the method 400 may proceed to block 418 where then the remote access controller 314 deletes the session identifier stored at the remote access controller 314 and/or marks the session identifier as expired. The remote access controller 314 may then deny any communication requests that include the expired session identifier. The runtime application 320b is then required to establish a new communication session with a new session identifier according to the steps discussed above if further communications are desired.

In another embodiment, the runtime application 320b may be finished accessing the remote access controller 314, and may encrypt the session identifier using the application security information (e.g., using the application private key) and call a communication session delete function included in the function definitions provided in the remote access controller authorization configuration table 308a. The application security information is provided to the remote access controller 314 using ACPI via RAC storage 317 using SMA. For example, the runtime engine 316 may provide the encrypted/signed session identifier and the application public key to the remote access controller, and the remote access controller 314 may verify the application security information as described above in block 410 (e.g., by verifying that a corresponding application public key stored in the BIOS key database 310 matches the application public key and verifying the hash generated from the session identifier and optionally a time stamp created using the application public key.) The decrypted session identifier is then deleted, a notification that the communication session has ended is provided to the runtime engine 316, and the remote access controller 314 prevents the runtime application 320b from accessing the remote access controller 314 in block 418.

Thus, systems and methods have been described that provide in-band access to a remote access controller. Runtime applications may include application security information that is also stored in a BIOS key database and/or other trusted storage device that is accessible by the remote access controller, and the operating system may use a session creation function defined by a BIOS configuration table during a managed boot to communicate with the remote access controller via a management interface. When a runtime application requests access to a remote access controller, the runtime application provides its application security information, which may include a session identifier, to the operating system. The remote access controller may verify the application security information and allow a communication session to be established between the remote access controller and the runtime application using the session identifier. The systems and methods of the present disclosure alleviate security concerns of other remote access controller in-band access systems in which credentials and commands are potentially exposed to other runtime applications that should not have access to the remote access controller. Thus, the communication sessions between each runtime application and the remote access controller are separate and distinct, preventing a runtime application from communicating with the remote access controller using another runtime application's communication session.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An in-band remote access controller access system, comprising:
   a chassis;
   a remote access controller that is located in the chassis and that is configured to provide out-of-band access through a network to a computing device;
   a Basic Input/Output System (BIOS) that is located in the chassis and coupled to the remote access controller, wherein the BIOS includes a BIOS storage that stores a configuration table including a plurality of function definitions that are configured to provide for management of an in-band communication session with the remote access controller;
   a secure storage system coupled to the BIOS and the remote access controller, wherein the secure storage system includes boot security information that is configured to provide for performance of a managed boot of the BIOS; and
   a processing system that is located in the chassis and coupled to the BIOS and the remote access controller, wherein the processing system is configured to:
      provide, to the remote access controller using at least one of the plurality of function definitions that was written to a system memory by the BIOS during the managed boot, application security information provided by an application requesting access to the remote access controller, and wherein the remote access controller is configured to:
         authenticate the application security information using the boot security information and, in response, establish a communication session with the application.

2. The system of claim 1, wherein the BIOS is configured to provide the plurality of function definitions to the processing system during the managed boot in order to provide for the management of an in-band communication session with the remote access controller.

3. The system of claim 1, wherein the configuration table is an Advanced Configuration and Power Interface (ACPI) table.

4. The system of claim 1, wherein the application security information includes an application public key, and a session identifier and a time stamp that are encrypted by an application private key.

5. The system of claim 4, wherein the authenticating the application security information using the boot security information includes:
   verifying, by the remote access controller, that the application public key is present in the boot security information; and
   decrypting, by the remote access controller, the time stamp and the session identifier using the application public key.

6. The system of claim 4, wherein the remote access controller is configured to validate the time stamp for a predetermined timeout threshold.

7. The system of claim 1, wherein the providing the remote access controller the application security information provided by the application requesting access to the remote access controller includes:
   using Shared Memory Access (SMA) to provide the application security information to the remote access controller.

8. An information handling system (IHS), comprising:
   a remote access controller;
   a processing system coupled to the remote access controller; and
   a memory system that is coupled to the processing system and that includes instructions that, when executed by the processing system, cause the processing system to provide a runtime engine that is configured to:
      provide, to the remote access controller using at least one of a plurality of function definitions that are configured to provide for management of an in-band communication session with the remote access controller and that were written to the memory system by a BIOS during a managed boot from a configuration table, application security information provided by an application requesting access to the remote access controller, and wherein the remote access controller is configured to:
      authenticate the application security information using boot security information stored in a secure storage system coupled to the remote access controller and, in response, establish a communication session with the application.

9. The IHS of claim 8, wherein the memory system receives the plurality of function definitions from the BIOS during the managed boot in order to provide for the management of an in-band communication session with the remote access controller.

10. The IHS of claim 8, wherein the configuration table is an Advanced Configuration and Power Interface (ACPI) table.

11. The IHS of claim 8, wherein the application security information includes an application public key, and a session identifier and a time stamp that are encrypted by an application private key.

12. The IHS of claim 11, wherein the authenticating the application security information using the boot security information includes:
   verifying, by the remote access controller, that the application public key is present in the boot security information; and
   decrypting, by the remote access controller, the time stamp and the session identifier using the application public key.

13. The IHS of claim 11, wherein the remote access controller is configured to validate the time stamp for a predetermined timeout threshold.

14. The IHS of claim 8, wherein the providing the remote access controller the application security information provided by the application requesting access to the remote access controller includes:
   using Shared Memory Access (SMA) to provide the application security information to the remote access controller.

15. A method of providing in-band access to a remote access controller, comprising:
   providing, by a processing system to a remote access controller using at least one of a plurality of function definitions that are configured to provide for management of an in-band communication session with the remote access controller and that were provided to a processing system by a BIOS during a managed boot from a configuration table, application security information provided by an application requesting access to the remote access controller;
   receiving, by the processing system, a notification that the remote access controller has authenticated the application security information using boot security information stored in a secure storage system coupled to the remote access controller and in response, established a communication session with the application; and
   providing, by the processing system, communications between the remote access controller and the application.

16. The method of claim 15, wherein the configuration table is an Advanced Configuration and Power Interface (ACPI) table.

17. The method of claim 15, wherein the application security information includes an application public key, and a session identifier and a time stamp that are encrypted by an application private key.

18. The method of claim 17, wherein the authenticating the application security information using the boot security information by the remote access controller includes:
   verifying, by the remote access controller, that the application public key is present in the boot security information; and
   decrypting, by the remote access controller, the time stamp and the session identifier using the application public key.

19. The method of claim 17, wherein the authenticating the application security information using the boot security information by the remote access controller includes:
   validating, by the remote access controller, the time stamp for a predetermined timeout threshold.

20. The method of claim 15, wherein the providing the remote access controller the application security information provided by the application requesting access to the remote access controller includes:
   using, by the processing system, Shared Memory Access (SMA) to provide the application security information to the remote access controller.

* * * * *